Dec. 2, 1958 K. FISCHER 2,863,007

DISTRIBUTED AMPLIFIER ARRANGEMENT

Filed June 23, 1954

INVENTOR.
KARL FISCHER
BY
[signature]

2,863,007
Patented Dec. 2, 1958

2,863,007

DISTRIBUTED AMPLIFIER ARRANGEMENT

Karl Fischer, Neu-Ulm, Germany

Application June 23, 1954, Serial No. 438,807
Claims priority, application Germany June 26, 1953
6 Claims. (Cl. 179—171)

The present invention relates to an amplifier arrangement and more particularly to a distributed amplifier.

There are known in the art distributed amplifiers which operate in push-pull in order to compensate for distortion which might be caused by even harmonics of the signal being amplified and which are generated in the amplifier arrangement. These known arrangements usually comprise first and second series of tubes symmetrically connected to input and output transformers, similarly to usual push-pull amplification circuits. The disadvantage of the arrangement is the great number of circuit elements and tubes required.

It is an object of the present invention to provide an amplifier arrangement which has all of the advantages including the suppression of harmonic distortion of the prior art push-pull amplification circuits but which requires the very minimum number of circuit components.

In accordance with the invention there is provided first amplifier means having an input circuit adapted to receive the signal to be amplified and an output circuit. Phase inverter means are connected to the input circuit in order to reverse the polarity of an input signal and phase inverter means are connected to the output circuit to reverse the polarity of the output signal of the amplifier means. Second amplifier means are also provided having an input and output circuit, the input circuit being connected to the output of the first phase inverter means and the output circuit being connected to the output of the output phase inverter means. Connection in this manner causes undesirable even harmonics generated in the first amplifier circuit to be compensated by even harmonics generated in the second amplifier circuit.

The novel features which are considered as characteristic for the invention are set forth in particular in the appended claims. The invention itself, however, both as to its construction and its method of operation, together with additional objects and advantages thereof, will be best understood when read in connection with the accompanying drawing which is a schematic diagram of a distributed amplifier arrangement in accordance with the invention.

Figure 1:
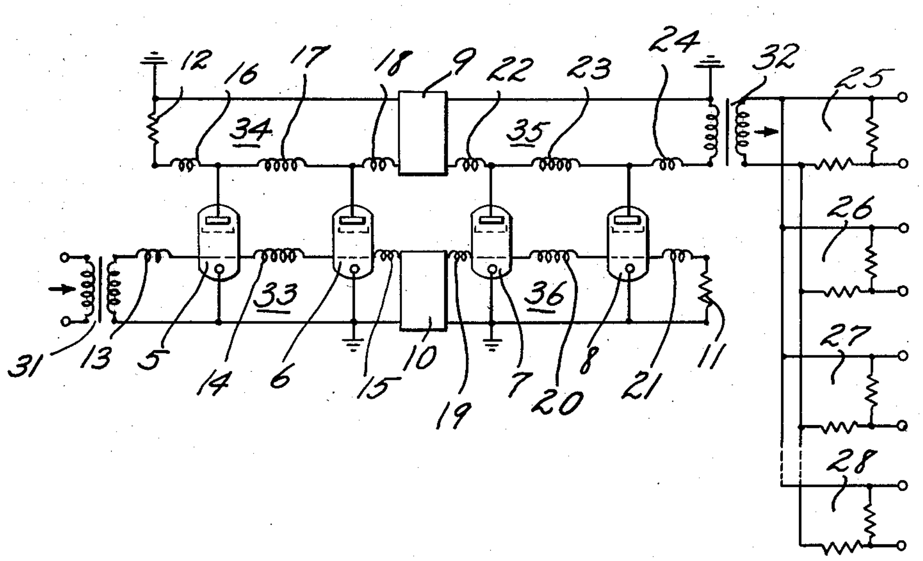

Referring now to the drawings, there is shown in Fig. 1 an input transformer 31 adapted to receive an input signal such as, for example, one supplied by an antenna and preferably having a turns ratio that the characteristic impedance of an input transmission network 33 will be matched to the surge impedance of a connected high frequence source, for example the antenna and a first group of amplifiers 5, 6. The input signal is applied in parallel between control grid and cathode of the amplifiers by means of an input transmission network 33 including a plurality of inductive elements 13, 14 and 15 and the inter-electrode, grid-cathode capacitive impedances of the amplifiers 5 and 6. The output end of transmission network 33 is connected to phase inverter 10. The output circuit of amplifiers 5 and 6 includes the inter-electrode, anode-cathode capacitive impedances of the amplifiers 5 and 6 and output transmission network 34 consisting of inductive elements 16, 17 and 18 and a terminating resistor 12 at one end thereof. Preferably, resistor 12 terminates output transmission network 34 in its characteristic impedance. As in the case of input transmission network 33, output transmission network 34 is terminated at its other end by a second phase inverter 9.

The second group of amplifiers comprises amplifier tubes 7 and 8 having an input transmission network 36 between control grid and cathode thereof supplied by the output of phase inverter 10. The network comprises a plurality of inductive elements 19, 20, 21 and the inter-electrode, grid-cathode capacitive impedances of the amplifiers 7 and 8 and the network is terminated at its remote end by a resistor 11 having a value equal to the characteristic impedance of the network so that there is no reflection from the remote end of the network. The output circuit of amplifiers 7 and 8 includes the inter-electrode, anode-cathode capacitive impedances of the amplifiers and output transmission network 35. Transmission network 35 includes a plurality of inductive elements 22, 23 and 24 and is terminated at the input end thereof by phase inverter 9 and at the remote end thereof by transformer 32. As in the case of input transformer 31, transformer 32 preferably has such a turns ratio, that the characteristic impedance of the output transmission network 35 will be matched to the load.

The load or output circuit for the amplifier arrangement comprises a plurality of linear quadrupole networks 25, 26, 27 and 28 including therein a plurality of ohmic impedance elements for decoupling the output circuits from the amplifier arrangement and decoupling the output circuits from one another. Although not shown, the output circuits may lead to a plurality of receivers which it is desired to couple to the single antenna supplying an input signal to the amplifier arrangement.

The operation of the circuit described above is most easily explained in terms of class B amplification. Assuming a sinusoidal input signal, tubes 5 and 6 amplify the positive going portions thereof. Phase inverter 10 shifts the phase of the input wave 180° and tubes 7 and 8 amplify only the portion of the phase shifted wave corresponding to the negative going portions of the input signal. Due to the action of phase inverter 9, the combined output of amplifier group 5, 6 and amplifier group 7, 8 available in output transmission network 35 is a sinusoidal wave of the same plurality as the sinusoidal input signal. Any second order, non-linear harmonic distortion which is produced by amplifier group 5, 6 is compensated by second order, nonlinear harmonic distortion produced by amplifier group 7, 8. This action corresponds exactly to the action of push-pull distributed amplifiers such as described in the introductory paragraphs.

Phase inverters 9 and 10 should be broad-banded. They may comprise transformers. In such case, a 1:1 turn ratio should be used so that the two groups of amplifiers are supplied with like amplitude signals. On the other hand, the phase inverter may comprise tube circuits known per se in the art. In this case the inverters should provide a phase shift of 180° or an odd harmonic thereof.

For optimum performance, the input transmission networks 33, 36 and the output transmission networks 34, 35 should be terminated at the respective ends thereof in their characteristic impedances to avoid reflection from the network ends. This may be accomplished by choosing phase inverters having proper values of input and output impedances and by choosing transformers 31, 32 having proper values of impedances. If these elements do not terminate the transmission networks in their characteristic impedances, various impedance elements may be added to the networks in a manner known per se in the art in order to compensate for any mismatch which is produced.

Figure 2:
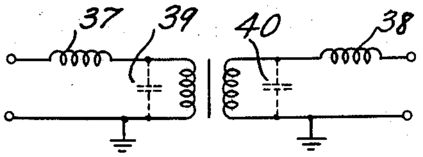

In order to compensate for possibly disturbing effects of the shunt capacitances (39, 40) of the various transformers in the present circuit it is preferable to enclose inductive impedance elements (37, 38) in the connection lines not grounded of these transformers, as shown in Fig. 2.

The explanation above relates to class B amplifier operation, however, it is to be understood that the circuit is equally applicable to class A, A—B or C operation. It is also to be understood that the various transmission networks can include T or $\pi$-filter networks or band-pass arrangements which are known in the art per se. It is also possible to shunt lumped capacities to the inter-electrode capacities of the amplifier tubes 5, 6, 7 and 8.

It is also to be understood that the various amplifiers can be arranged in more than two groups. Thus, for example, it is possible to obtain even better distortion-free performance, for example, by placing a phase inverter between amplifiers 5 and 6 and a corresponding phase inverter between the two tubes in the output transmission network thereof, and by similarly adding phase inverters between tubes 7 and 8 in the input and output transmission networks thereof. Furthermore, for optimum performance the two groups of amplifiers should produce equal output amplitudes. Therefore, in the case of equal input signal-amplitudes, which are fed to the two amplifier groups, the amplification factors of the groups are equal.

It is also to be understood that distortion can be reduced by adding various feedback circuits to the disclosed arrangement. For example, there may be provided impedance elements, not shunted with respect to high frequency, in series with each of the cathodes of the amplifiers stages to obtain degenerative feedback. It is also possible to employ electron discharge devices or transistors having small amounts of anode feedback. Finally, one can use pentode or tetrode tubes in order to lessen the possibility of self-excitation of the amplifier.

In addition to the advantages already described, including the necessity for far fewer tubes and related circuit components (only half as many tubes are used as in comparable push-pull circuits), the above-described amplifier arrangement has the further advantage of being very broadbanded. In an embodiment of the invention constructed, it was found possible to amplify signals over a frequency band extending from 2–40 megacycles. In this case it is advantageous to employ an output circuit comprising a plurality of linear quadrupoles as already described in detail.

A further advantage of the disclosed amplifier arrangement is that it operates at a very low noise level, for example with a noise figure of 3 db at a frequency of 10 megacycles.

It will be understood that each of the elements described above, or two or more together, may also find a useful application in other types of amplifiers differing from the types described above.

While the invention has been illustrated and described as embodied in an amplifier comprising two sets of stages, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a distributed amplifier arrangement, in combination, a plurality of amplifier vacuum tubes; an artificial grid transmission line and an artificial anode transmission line interconnecting said tubes, each of said transmission lines being formed by an inductive impedance coil between the grids and anodes, respectively, of adjacent tubes connected thereby, cooperating with the electrode capacity of each particular tube; and separate phase inverter means connected in said grid and anode transmission lines, respectively, at the respective midpoints thereof for establishing an inverted phase relationship between the voltages appearing in said transmission lines on opposite sides of said phase inverter means, whereby the effects of distortion due to even harmonics developed in the amplifier arrangement are eliminated.

2. In a distributed amplifier arrangement, in combination a plurality of amplifier tubes each having a cathode, an anode and a grid; an input transmission line interconnecting the grids of said amplifier tubes and including for each of said tubes a circuit incorporating an inductive impedance coil and the grid-cathode circuit of the particular tube as a capacity; an output transmission line interconnecting the anodes of said amplifier tubes and including for each of said tubes a circuit incorporating an inductive impedance coil and the anode-cathode circuit of the particular tube as a capacity; an input coupling means connected to the input end of said input transmission line for applying a signal to be amplified thereto; a first terminal impedance connected to the opposite end of said input transmission line for eliminating signal reflection; a second terminal impedance connected to said output transmission line at its end nearest to said input coupling means, for eliminating signal reflection; an output coupling means connected to the opposite end of said output transmission line for developing thereacross the amplified output signal; and two separate phase inverter means connected in said input transmission line and said output transmission line, respectively, at the respective midpoint thereof for establishing an inverted phase relationship between the voltages appearing in said input transmission line and said output transmission line, respectively, on opposite sides of said phase inverter means whereby the effects of distortion due to even harmonics developed in the amplifier are eliminated.

3. A distributed amplifier arrangement as set forth in claim 1, wherein at least one of said phase inverter means is a broad-band transformer.

4. A distributed amplifier arrangement as set forth in claim 2, wherein at least one of said phase inverter means is a broad-band transformer.

5. In a distributed amplifier arrangement, in combination, a first input section having input and output terminals and including at least one first amplifier tube having a grid and an anode, and first input transmission means connected in circuit between said grid of said first amplifier tube and said input and output terminals of said first input section; input coupling means connected to said input terminals of said first input section for applying a signal to be amplified thereto; a first broad-band transformer having input terminal connected to said output terminals of said first input section and having output terminals; a second input section having input terminals connected to said output terminals of said transformer and having output terminals, said second input section including at least one second amplifier tube having a grid and an anode, and second input transmission means connected in circuit between said grid of said second amplifier tube and said input and output terminals of said second input section; terminal impedance means connected to said output terminals of said second input section; a first output section having a first and second end and including first output transmission means connected in circuit between said anode of said first amplifier tube and said first and second ends of said first output section; terminal impedance means connected to said first end of said first output section; a second broad-band transformer having input terminals connected to said second end of said first output section and having output terminals; a second output section having a first end connected to said output terminals of said second transformer and having output terminals, said second output section including second output transmission means connected in circuit with said anode of said second amplifier tube and between said first end and said output terminals of said second output section; and output coupling means connected to said output terminals of said second output section for developing thereacross the amplified output signal.

6. Apparatus as claimed in claim 5 wherein said broad-band transformers have a 1:1 turns ratio.

References Cited in the file of this patent

UNITED STATES PATENTS

| | | |
|---|---|---|
| 2,210,028 | Doherty | Aug. 6, 1940 |
| 2,605,333 | Job | July 29, 1952 |
| 2,670,408 | Kelley | Feb. 23, 1954 |
| 2,735,941 | Peck | Feb. 21, 1956 |
| 2,745,004 | Yeo Pay Yu | May 8, 1956 |

FOREIGN PATENTS

| | | |
|---|---|---|
| 460,562 | Great Britain | June 25, 1957 |